United States Patent
Brahma et al.

(10) Patent No.: US 10,359,885 B2
(45) Date of Patent: Jul. 23, 2019

(54) TOUCH INDUCED FLICKER MITIGATION FOR VARIABLE REFRESH RATE DISPLAY

(71) Applicant: Apple Inc., Cupertino, CA (US)

(72) Inventors: Kingsuk Brahma, San Francisco, CA (US); Jie Won Ryu, Sunnyvale, CA (US); Hopil Bae, Sunnyvale, CA (US); Yafei Bi, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 15/650,770

(22) Filed: Jul. 14, 2017

(65) Prior Publication Data

US 2018/0059868 A1 Mar. 1, 2018

Related U.S. Application Data

(60) Provisional application No. 62/380,963, filed on Aug. 29, 2016.

(51) Int. Cl.
*G06F 3/041* (2006.01)
*G09G 3/20* (2006.01)
(Continued)

(52) U.S. Cl.
CPC ........ *G06F 3/0418* (2013.01); *G02F 1/13338* (2013.01); *G06F 3/044* (2013.01);
(Continued)

(58) Field of Classification Search
CPC ...... G06F 3/0412; G06F 3/044; G06F 3/0416; G06F 3/0418; G09G 3/2022–204; G09G 2340/0435
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Patrick F Marinelli
(74) *Attorney, Agent, or Firm* — Kubota & Basol LLP

(57) ABSTRACT

Touch induced flicker for variable refresh rate (VRR) displays can be reduced by adjusting one or more voltages. Synchronization of touch sensing operations after an immediate exit can introduce flicker issues into the VRR display. In some examples, the touched induced flicker can be reduced or eliminated by tuning the voltage on a common electrode (Vcom) to a tuning point that reduces a maximum error below a threshold, irrespective of refresh rate. In some examples, touch induced flicker can be reduced or eliminated by monitoring average Vcom, and when the change in average Vcom exceeds a threshold, Vcom can be adjusted to counteract the change in average Vcom due to the variable refresh rate and/or immediate exit. In some examples, touch induced flicker can be reduced or eliminated by applying a direct current (DC) pedestal to pixel gate lines during touch sensing scans.

20 Claims, 11 Drawing Sheets

(51) Int. Cl.
*G06F 3/044* (2006.01)
*G02F 1/1333* (2006.01)

(52) U.S. Cl.
CPC ......... *G06F 3/0412* (2013.01); *G09G 3/2022* (2013.01); *G09G 2340/0435* (2013.01)

(56) References Cited

U.S. PATENT DOCUMENTS

| | | | |
|---|---|---|---|
| 5,825,352 A | | 10/1998 | Bisset et al. |
| 5,835,079 A | | 11/1998 | Shieh |
| 5,880,411 A | | 3/1999 | Gillespie et al. |
| 6,188,391 B1 | | 2/2001 | Seely et al. |
| 6,310,610 B1 | | 10/2001 | Beaton et al. |
| 6,323,846 B1 | | 11/2001 | Westerman et al. |
| 6,690,387 B2 | | 2/2004 | Zimmerman et al. |
| 7,015,894 B2 | | 3/2006 | Morohoshi |
| 7,184,064 B2 | | 2/2007 | Zimmerman et al. |
| 7,663,607 B2 | | 2/2010 | Hotelling et al. |
| 8,289,312 B2 | | 10/2012 | Matsuda et al. |
| 8,479,122 B2 | | 7/2013 | Hotelling et al. |
| 8,988,471 B2 | * | 3/2015 | Al-Dahle ............... H04N 17/00 345/690 |
| 9,001,097 B2 | * | 4/2015 | Al-Dahle ............... G09G 3/006 345/207 |
| 9,013,384 B2 | * | 4/2015 | Al-Dahle ............. G09G 3/3611 345/87 |
| 9,318,069 B2 | * | 4/2016 | Nambi ..................... G09G 3/36 |
| 9,418,626 B2 | * | 8/2016 | Reynolds .............. G06F 3/0418 |
| 9,501,993 B2 | * | 11/2016 | Nambi ..................... G09G 3/36 |
| 9,519,164 B2 | * | 12/2016 | Al-Dahle ............. G02F 1/13338 |
| 9,786,254 B2 | * | 10/2017 | Reynolds .............. G06F 3/0418 |
| 9,910,533 B2 | * | 3/2018 | Agarwal ............... G06F 3/0416 |
| 9,916,799 B1 | * | 3/2018 | Jo ........................ G09G 3/3618 |
| 9,922,622 B2 | * | 3/2018 | Reynolds .............. G06F 3/0418 |
| 9,979,922 B2 | * | 5/2018 | Konishi .................... H04N 5/63 |
| 2006/0197753 A1 | | 9/2006 | Hotelling |
| 2009/0058763 A1 | * | 3/2009 | Doi ..................... G09G 3/3688 345/55 |
| 2011/0210940 A1 | * | 9/2011 | Reynolds .............. G06F 3/0418 345/174 |
| 2011/0210941 A1 | * | 9/2011 | Reynolds .............. G06F 3/0418 345/174 |
| 2013/0328755 A1 | * | 12/2013 | Al-Dahle ............. G09G 3/3655 345/87 |
| 2013/0328759 A1 | * | 12/2013 | Al-Dahle ............. G02F 1/1309 345/89 |
| 2013/0328843 A1 | * | 12/2013 | Al-Dahle ............. G09G 3/006 345/207 |
| 2013/0329057 A1 | * | 12/2013 | Al-Dahle ............. H04N 17/00 348/189 |
| 2014/0198093 A1 | * | 7/2014 | Nambi ..................... G09G 3/36 345/212 |
| 2014/0198114 A1 | * | 7/2014 | Nambi ..................... G09G 3/36 345/522 |
| 2014/0198138 A1 | * | 7/2014 | Nambi ..................... G09G 3/36 345/690 |
| 2014/0225817 A1 | * | 8/2014 | Huang ................. G09G 3/3677 345/87 |
| 2015/0103104 A1 | | 4/2015 | Lee et al. |
| 2015/0302831 A1 | * | 10/2015 | Reynolds .............. G06F 3/0418 345/174 |
| 2016/0125785 A1 | | 5/2016 | Wang et al. |
| 2016/0189616 A1 | * | 6/2016 | Oh ........................ G09G 3/3258 345/209 |
| 2016/0275916 A1 | * | 9/2016 | Glen ...................... G09G 5/395 |
| 2016/0370915 A1 | * | 12/2016 | Agarwal ............... G06F 3/0416 |
| 2017/0047027 A1 | * | 2/2017 | Nambi ..................... G09G 3/36 |
| 2017/0193971 A1 | * | 7/2017 | Bi ........................... G09G 5/39 |
| 2017/0206850 A1 | * | 7/2017 | Kim ..................... G09G 3/3696 |
| 2017/0249892 A1 | * | 8/2017 | Jo ........................ G09G 3/2092 |
| 2017/0295343 A1 | * | 10/2017 | Konishi ............... G09G 3/2096 |
| 2018/0059868 A1 | * | 3/2018 | Brahma ................ G06F 3/0418 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH INDUCED FLICKER MITIGATION FOR VARIABLE REFRESH RATE DISPLAY

CROSS REFERENCE TO RELATED APPLICATION

This application claims the benefit under 35 USC 119(e) of U.S. Patent Application No. 62/380,963, filed Aug. 29, 2016, the contents of which are incorporated herein by reference in their entirety for all purposes.

FIELD OF THE DISCLOSURE

This relates generally to touch sensitive devices and, more specifically, to touch-sensitive display devices that can have a variable refresh rate.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event. Additionally, touch sensitive devices can also accept input from one or more active styli.

As touch sensing technology continues to improve, variable display rate displays can be used to save power when displaying static images or slowly changing images, or to improve performance in computationally intensive graphical environments (e.g., gaming environments). However, variable display rate operation can disrupt the synchronization between the display functions and various touch and/or stylus sensing functions, thereby degrading the performance of the device.

SUMMARY OF THE DISCLOSURE

This relates to mitigation of touch induced flicker for variable refresh rate (VRR) displays. VRR display operation can be beneficial, for example, to reduce power when displaying static or slow changing data and/or to avoid display artifacts by providing sufficient time to render high fidelity images in computationally intensive environments (e.g., video game applications) before refreshing the display. However, adjusting the refresh rate of the display can complicate the synchronization of various sensing and display operations, and can degrade performance. Additionally, synchronization of touch sensing operations after an immediate exit can introduce flicker issues into the VRR display. In some examples, the touched induced flicker can be reduced or eliminated by tuning the voltage on a common electrode (Vcom) to a tuning point that reduces a maximum error below a threshold, irrespective of refresh rate. In some examples, touch induced flicker can be reduced or eliminated by monitoring average Vcom, and when the change in average Vcom exceeds a threshold, Vcom can be adjusted to counteract the change in average Vcom due to the variable refresh rate and/or immediate exit. In some examples, touch induced flicker can be reduced or eliminated by applying a direct current (DC) pedestal to pixel gate lines during touch sensing scans. In some examples, a combination of two or more of these flicker mitigation techniques can be employed.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to mitigation of touch induced flicker for variable refresh rate (VRR) displays. VRR display operation can be beneficial, for example, to reduce power when displaying static or slow changing data and/or to avoid display artifacts by providing sufficient time to render high fidelity images in computationally intensive environments (e.g., video game applications) before refreshing the display. However, adjusting the refresh rate of the display can complicate the synchronization of various sensing and display operations, and can degrade performance. Additionally, synchronization of touch sensing operations after an immediate exit can introduce flicker issues into the VRR display. In some examples, the touched induced flicker can be reduced or eliminated by tuning the voltage on a common electrode (Vcom) to a tuning point that reduces a maximum error below a threshold, irrespective of refresh rate. In some examples, touch induced flicker can be reduced or eliminated by monitoring average Vcom, and when the change in average Vcom exceeds a threshold, Vcom can be adjusted to counteract the change in average Vcom due to the variable refresh rate and/or immediate exit. In some examples, touch induced flicker can be reduced or eliminated by applying a direct current (DC) pedestal to pixel gate lines during touch sensing scans. In some examples, a combination of two or more of these flicker mitigation techniques can be employed.

Figure 1A:
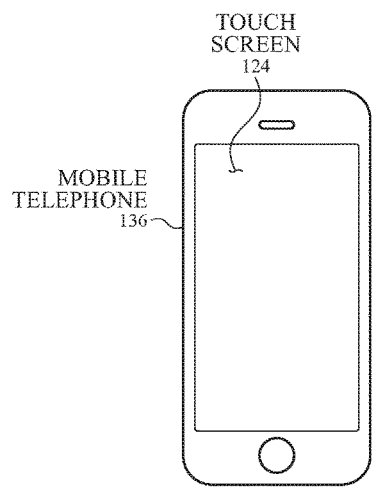
FIGS. 1A-1D illustrate examples of systems with variable refresh rate (VRR) displays that can implement mitigation techniques to reduce touch induced flicker according to examples of the disclosure.
Figure 1B:
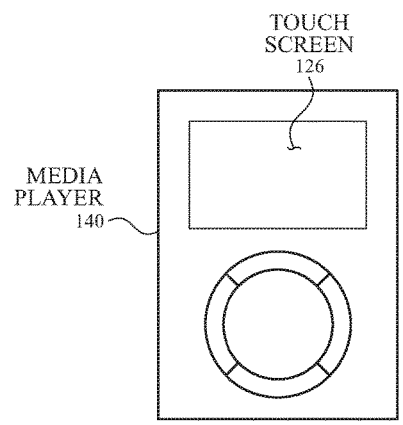
Figure 1C:
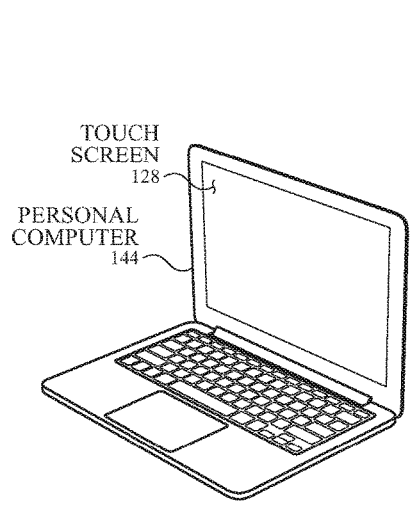
Figure 1D:
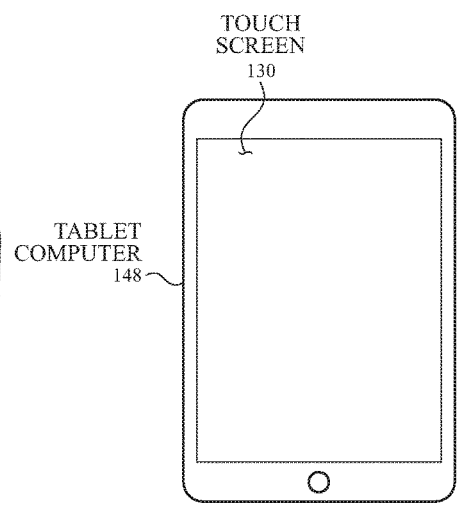

FIGS. 1A-1D illustrate examples of systems with variable refresh rate (VRR) displays that can implement mitigation techniques to reduce touch induced flicker according to examples of the disclosure. FIG. 1A illustrates an exemplary mobile telephone 136 that includes a VRR touch screen 124 and other computing system blocks that can implement mitigation techniques to reduce touch induced flicker according to examples of the disclosure. FIG. 1B illustrates an example digital media player 140 that includes a VRR touch screen 126 and other computing system blocks that can implement mitigation techniques to reduce touch induced flicker according to examples of the disclosure. FIG. 1C illustrates an example personal computer 144 that includes a VRR touch screen 128 and other computing system blocks that can implement mitigation techniques to reduce touch induced flicker according to examples of the disclosure. FIG. 1D illustrates an example tablet computing device 148 that includes a VRR touch screen 130 and other computing system blocks that can implement mitigation techniques to reduce touch induced flicker according to examples of the disclosure. The VRR touch screen and computing system blocks that can implement mitigation techniques to reduce touch induced flicker can be implemented in other devices including wearable devices.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
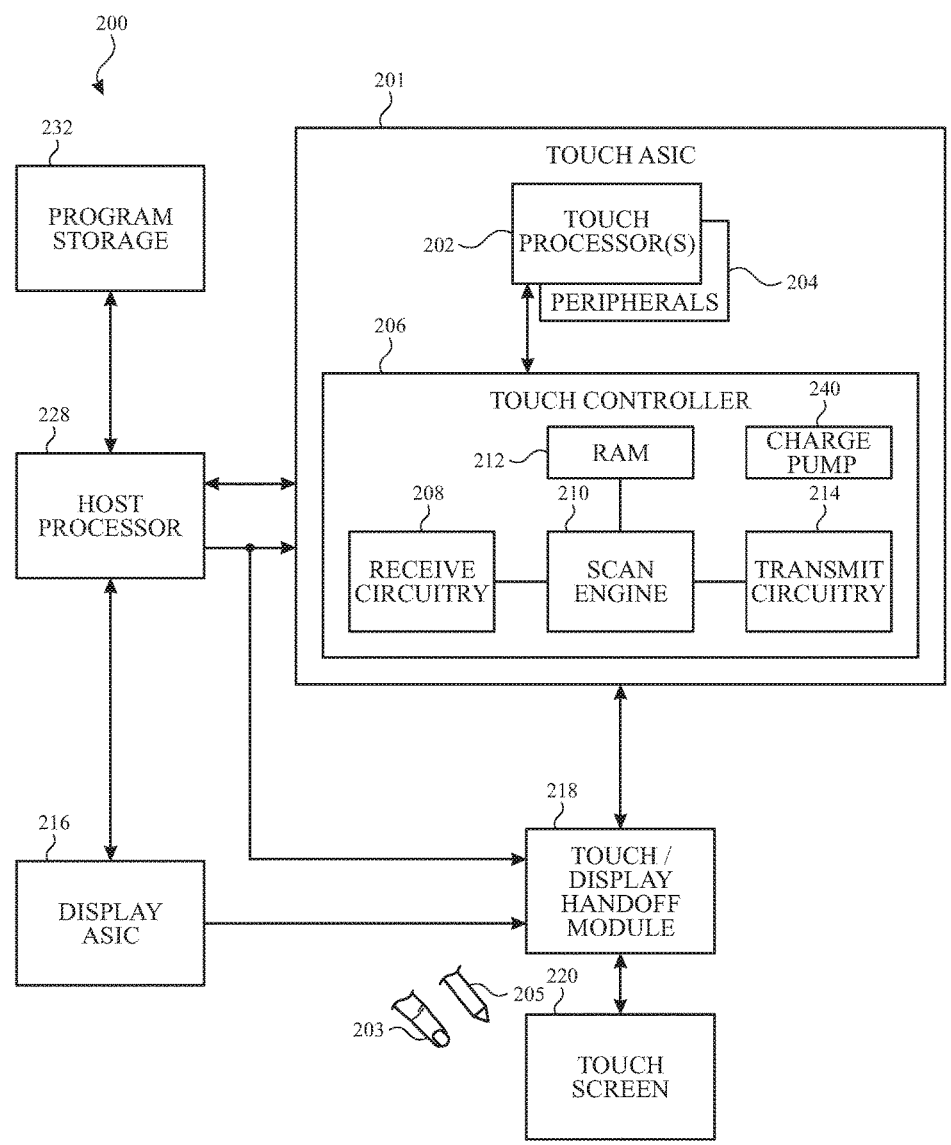
FIG. 2 illustrates a block diagram of an example computing system capable of implementing a synchronization scheme to synchronize display functions and various touch and/or stylus sensing functions of touch screen and capable of implementing mitigation techniques to reduce touch induced flicker according to examples of the disclosure.

FIG. 2 illustrates a block diagram of an example computing system 200 capable of implementing a synchronization scheme to synchronize display functions and various touch and/or stylus sensing functions of touch screen 220 and capable of implementing mitigation techniques to reduce touch induced flicker according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic), transmit circuitry 214 (which can include analog or digital driver logic), and charge pump 240. In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. A charge pump 240 can be used to generate the supply voltage for the transmit circuitry 214, and as described in more detail below, can also be used to generate a voltage pedestal to mitigate touch induced flicker. In some examples, charge pump can be part of the transmit circuitry 214. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In some examples, display ASIC 216 or handoff module 218 can include a charge pump that can be used to generate a voltage pedestal to mitigate touch induced flicker.

Touch screen 220 can have a variable refresh rate display. Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. As described herein, Vcom can refer to the voltage of the common electrode, which can be different during display functions and touch sensing functions. In some examples, a touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and performing actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing and synchronizing display functions and various touch and/or stylus sensing functions, and/or execute software or firmware implementing mitigation techniques to reduce touch induced flicker according to examples of the disclosure. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen 220. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 expects a stylus scan (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
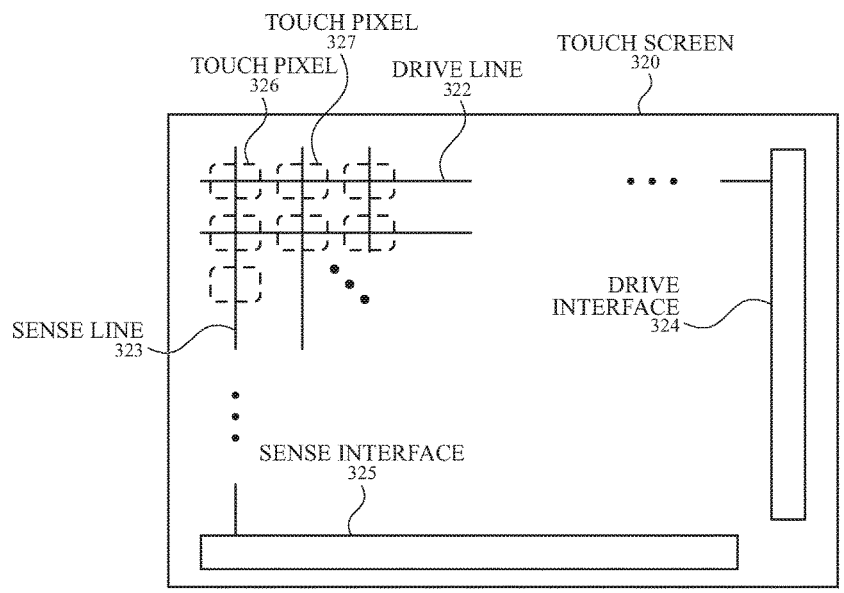
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels in receive circuitry 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
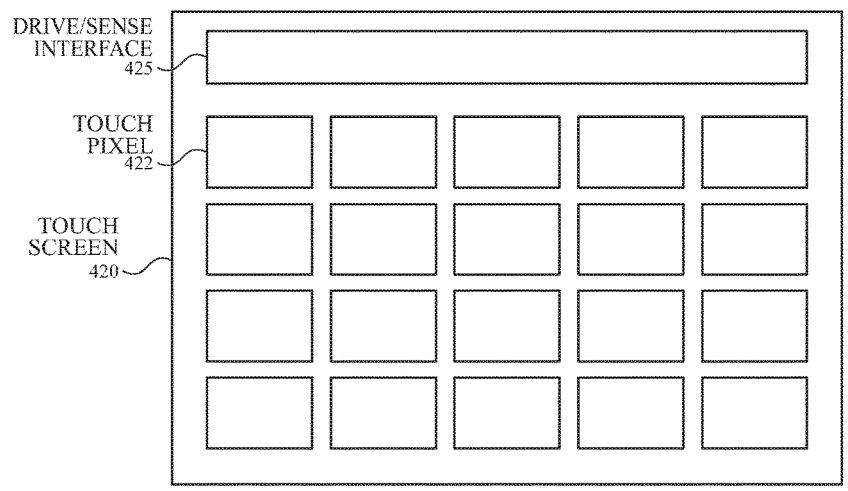
FIG. 4 illustrates an example touch screen including touch sensing circuitry configured with self-capacitance electrodes according to examples of the disclosure.

Additionally or alternatively, the touch screen can include self-capacitance touch sensing circuitry including an array of self-capacitance electrodes. FIG. 4 illustrates an example touch screen including touch sensing circuitry configured with self-capacitance electrodes according to examples of the disclosure. Touch screen 420 can include touch sensing circuitry that can include a capacitive sensing medium having a plurality of electrically isolated touch pixel electrodes 422 (e.g., a pixelated self-capacitance touch screen). Touch pixel electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen).

Figure 5:
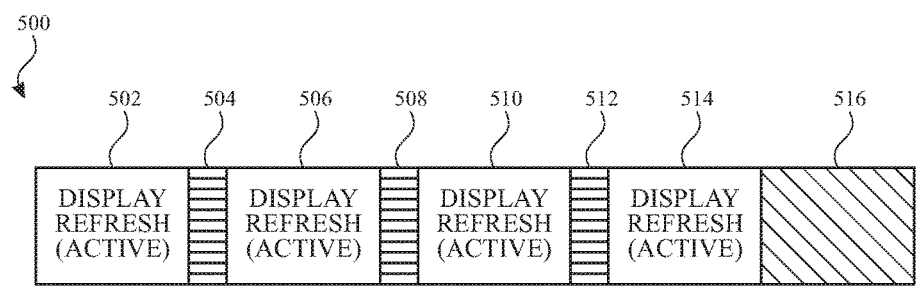
FIG. 5 illustrates an example frame timing diagram for a display according to examples of the disclosure.

In a system with a fixed refresh rate display, the various sensing operations can be timed to occur during specific display operations to reduce interference (e.g., during intra-frame pauses when the display is not actively refreshing). FIG. 5 illustrates an example frame timing diagram for a display according to examples of the disclosure. The vertical components of a single frame 500 can include display active periods 502, 506, 510 and 514 separated by intra-frame blanking periods 504, 508 and 512. The frame 500 can conclude with a vertical blanking period 516. During the display active periods 502, 506, 510 and 514, noise from voltages applied in the display can couple into the touch sensors due to proximity and interfere with the touch sensing operations. The display noise can be significantly reduced when the display is not active (and charge capacitors maintain the charge), for example, during intra-frame blanking periods 504, 508 and 512 and vertical blanking period 516. Thus, performing touch sensing scans during the quieter intra-frame blanking periods 504, 508 and 512 and vertical blanking period 516—e.g., time multiplexing display refresh and scanning operations—can reduce interference from the display. It should be noted that the number of display active periods and intra-frame blanking periods illustrated in FIG. 5 are only representative, and additional or fewer display active periods and intra-frame blanking periods can be implemented for a frame. Additionally, the order and arrangement of display active refresh periods, intra-frame blanking periods and vertical blanking period in frame 500 illustrated in FIG. 5 can be different (e.g., begin with vertical blanking rather than end with vertical blanking). In some examples, the vertical blanking period 516 and the intra-frame blanking periods 504, 508 and 512 can be chosen to have the same duration, though in other examples the duration of vertical blanking 516 can be longer than intra-frame blanking. The location of vertical blanking period 516 and the intra-frame blanking periods 504, 508 and 512 can be chosen such that they are spaced at fixed, regular intervals in time so that touch and stylus sensing scans can be performed at a constant frequency.

In systems that time-multiplex the performance of touch and/or stylus sensing functions and display functions (e.g., because of shared circuitry and/or to reduce interference between different functions), the touch and/or stylus sensing functions can be performed during the intra-frame blanking periods. Some of the touch screen, or the entire touch screen can be scanned during each of the intra-frame blanking periods. For example, as illustrated in FIG. 5, mutual capacitance touch scans can be performed on a portion of a touch sensor panel to detect one or more fingers during each of blanking periods 504, 508, 512 and 516, so as to scan the entire touch screen during the frame 500. In such an example, the touch scanning rate can match the display frame rate (e.g., both can have a 60 Hz or 120 Hz rate). In other examples, the touch scanning rate can be increased or decreased relative to the display frame rate. The touch or stylus sensing scanning frequency can be doubled by scanning the entire touch screen twice during a display frame or quadrupled by scanning the entire touch screen during each blanking period in FIG. 5. Alternatively, the touch or stylus sensing rate can be reduced by scanning only a portion of the touch screen during a display frame. In some examples, touch sensing and display operation can occur at the same rate in order to reduce any mismatch or latency between the content displayed on the screen and the corresponding touch sensing data.

Although touch and stylus scans are discussed, other sensor scans can require synchronization with the display intra-frame and vertical blanking periods to reduce noise. Additionally, although discussed in terms of intra-frame blanking periods and vertical blanking periods, these periods are examples of pauses in a frame when the display is not in active refresh (e.g., idle), and can be referred to as intra-frame pauses (IFPs).

Figure 6A:
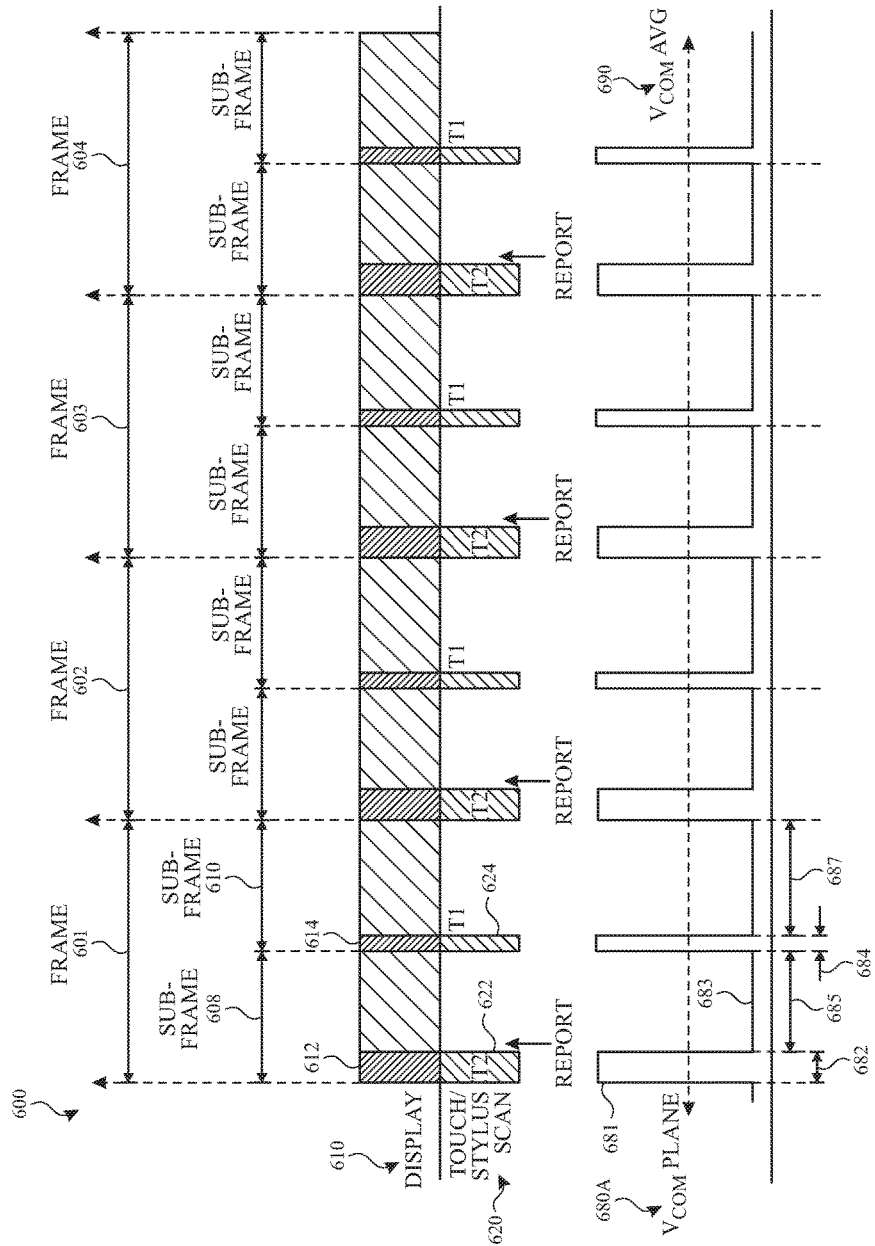
FIG. 6A illustrates an example timing diagram for synchronizing sensing operations with display operations according to examples of the disclosure.

To ensure proper synchronization of sensing and display operations and the proper processing of data generated by the sensing operations corresponding to the displayed images, various timing schemes can be employed. FIG. 6A illustrates an example timing diagram 600 for synchronizing sensing operations with display operations according to examples of the disclosure. The example illustrated in FIG. 6A can correspond to a continuous-touch mode (e.g., touch scans performed during each display frame) with a fixed or default display refresh rate (e.g., 60 Hz, 120 Hz, etc.). FIG. 6A illustrates four display frames 601-604 for the display timing diagram 610. In some examples, one or more display frames can include multiple display sub-frames. For example, display frame 601 can include two display sub-frames 608 and 610. Although two sub-frames are illustrated, a display frame can be divided into a different number of sub-frames. A display frame and/or a display sub-frame can include one or more IFPs. For example, the first display sub-frame of display frame 601 can include IFP 612, and the second display sub-frame of display frame 601 can include IFP 614. The number, arrangement, and duration of IFPs can be the same or different within or between display sub-frames.

During the IFPs the display refresh is paused and one or more sensing scans can be performed. For example, as illustrated in FIG. 6A, touch and/or stylus scanning timing diagram 620 can include two scanning periods 622 and 624 corresponding to IFPs 612 and 614. For example, a touch sensing scan (e.g., a scan of the touch screen to sense one or more objects such as a finger or passive stylus) can be performed in an IFP during a first sub-frame. If the touch sensing scan of the touch screen is performed once during a display frame, the touch scanning rate and the display frame rate can be the same. Thus, as illustrated in FIG. 6A for example, the touch sensing scan can be performed during scanning period 622 (corresponding to IFP 612), such that a touch sensing scan of the touch screen can be completed during the display frame. In some examples, a stylus sensing scan can be performed during one or more IFPs to sense an active stylus. For example, a stylus sensing scan can be performed during scanning period 624 (corresponding to IFP 614). In some examples, a stylus sensing scan can also be performed during at least a part of scanning period 622 (corresponding to IFP 612). In some examples, the stylus sensing scan can be divided into scan steps (e.g., to scan some or all of the row electrodes during a step and to scan some or all of the column electrodes of a touch screen during another step). One of the scan steps can be performed during at least a part of scanning period 622 and one of the scanning steps can be performed during scanning period 624. If the stylus sensing scan of the touch screen is performed once during a display frame, the stylus scanning rate and the display frame rate can be the same. If the stylus sensing scan of the touch screen is performed once or twice during each of two sub-frames of a display frame, the stylus scanning rate can be double or quadruple the display frame rate. For ease of reference, "T2" can refer to the touch (and possibly stylus) sensing scan and "T1" can refer to the stylus sensing scan. The two sub-frame pattern of scans, T2 in a first sub-frame followed by T1 in a second sub-frame, can be continued for each display frame. Although T1 and T2 are generally described below in terms of touch and/or stylus scans, the sensing scans and their corresponding durations are not so limited. More generally, the sub-frames can include the same or different types of scans with the same or different durations. Introduction of variable refresh rate by extended blanking of the display for sub-frames periods can, in some cases, change the distribution or frequency of sub-frame scans, as described below with respect to FIG. 6C, for example.

The data generated from the touch and/or stylus sensing scans can be reported (e.g., from the touch ASIC 201 to the host processor 228) at various intervals for processing. For example, in the example illustrated in FIG. 6A, data can be reported at or proximate to the conclusion of a touch sensing scan. As discussed in more detail below, reporting touch data at or proximate to the conclusion of a touch sensing scan (performed during a first-sub-frame of a scanning pattern) can maintain the synchronization between touch and display functions. Because the display refresh rate is fixed (or at a default before introducing variable refresh rates), data can be reported at regular intervals to simplify processing.

Some displays can support a variable refresh rate. A variable refresh rate can be generated by inserting a period of extended blanking (i.e., no active refresh) between two display frames in which active refresh occurs. The duration of the extended blanking can depend on the desired refresh rate. For example, in a system with a 60 Hz display frame, adding a 60 Hz frame of extended blanking can change the display refresh rate to 30 Hz (i.e., refresh the display once every two display frame periods), and adding two 60 Hz frames of extended blanking can change the display refresh rate to 20 Hz (i.e., refresh the display once every 3 display frame periods). In other examples, a system can have a 120 Hz display frame. Adding a 120 Hz frame (or two sub-frames) of extended blanking can change the display refresh rate to 60 Hz, adding three sub-frames of extended blanking can change the display refresh rate to 48 Hz and adding four sub-frames of extended blanking can change the display refresh rate to 40 Hz. It should be understood that the available frame refresh rates can depend on a default frame rate and the number of blanking frames. Additionally, in other examples, extended blanking of a duration corresponding to one or more sub-frames (or any other duration), rather than an integer number of display frames, can be inserted between display frames.

The display frame can be divided into a different number of sub-frames depending, for example, on the desired flexibility of variable refresh rates. For example, when a frame is divided into four sub-frames (rather than two sub-frames per frame) one sub-frame of extended blanking can reduce the display refresh rate from 60 Hz to 48 Hz. Similarly, two sub-frames of extended blanking can reduce the display refresh rate from 60 Hz to 40 Hz. Increasing the number of sub-frames per display frame can increase the range and granularity of the available variable refresh rates.

Figure 6B:
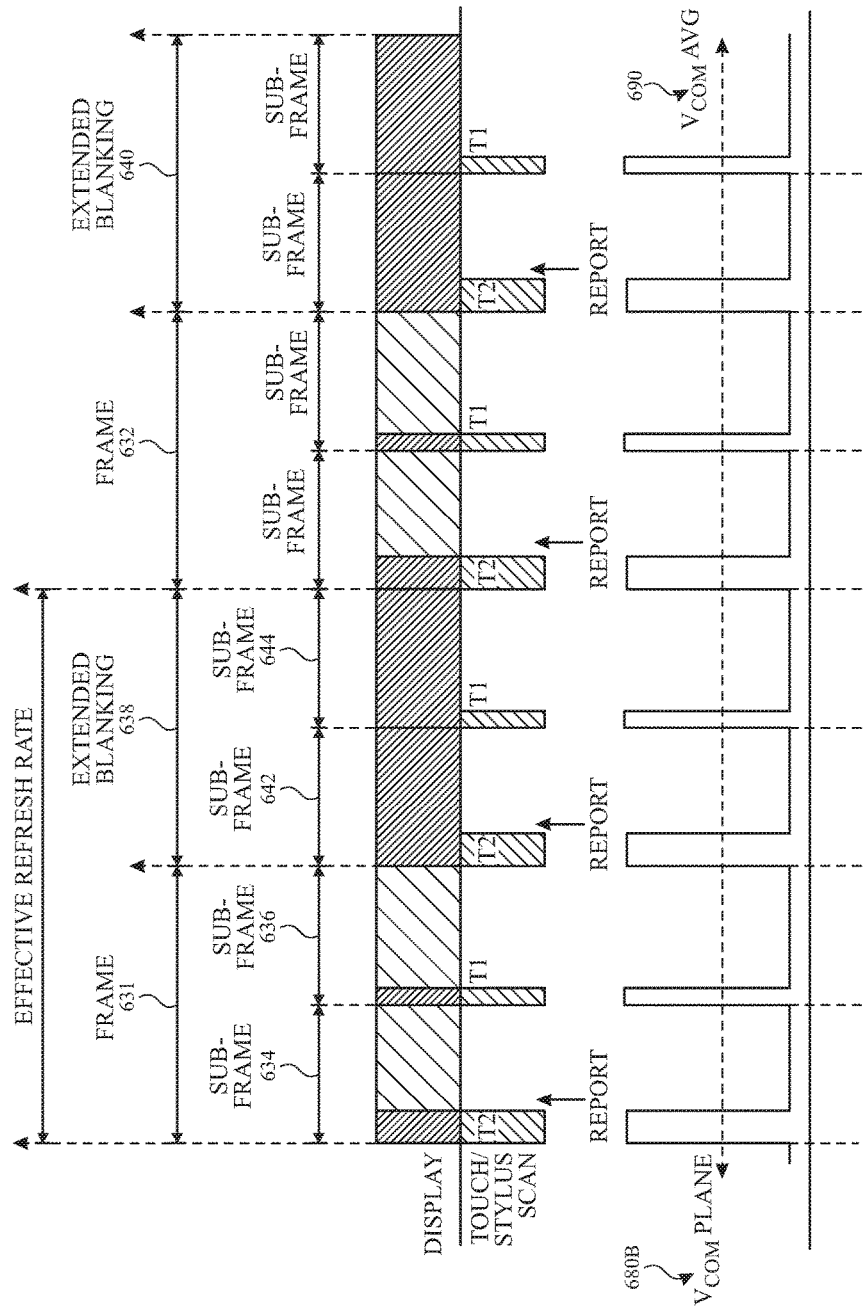
FIG. 6B illustrates an example timing diagram for synchronizing sensing operations with display operations for a variable refresh rate display according to examples of the disclosure.

FIG. 6B illustrates an example timing diagram for synchronizing sensing operations with display operations for a variable refresh rate display according to examples of the disclosure. FIG. 6B illustrates two display frames 631 and 632 (each divided into two sub-frames 634 and 636) followed by a frame period (or two sub-frame periods) of extended blanking 638 and 640. If, for example, display frame 631 corresponds to a 120 Hz frame, the effective refresh rate of display frame 631 and extended blanking 638 can be 60 Hz. For simplicity, the IFPs and corresponding scanning operation (e.g., T2 followed by T1) for the display frame 601 in FIG. 6A can be similar to the IFPs and corresponding scanning operation for the display frame 631 in FIG. 6B. During periods of extended blanking, the touch and/or stylus sensing scans can continue in the same pattern (e.g., T2 followed by T1) as during a display frame. For example, during the first sub-frame period 642 of extended blanking 638, the touch system can perform the same scanning operation as the first sub-frame 634 of display frame 631. During the second sub-frame period 644 of extended blanking 638, the touch system can perform the same scanning operation as the second sub-frame 636 of display frame 631. The pattern of IFPs and corresponding sensing scans can continue for subsequent sub-frames. Like in FIG. 6A, the touch system can continue to report data from the sensing operation at a regular interval (e.g., every two sub-frames). For example, reporting events can occur at the end of touch sensing operation T2.

Figure 6C:
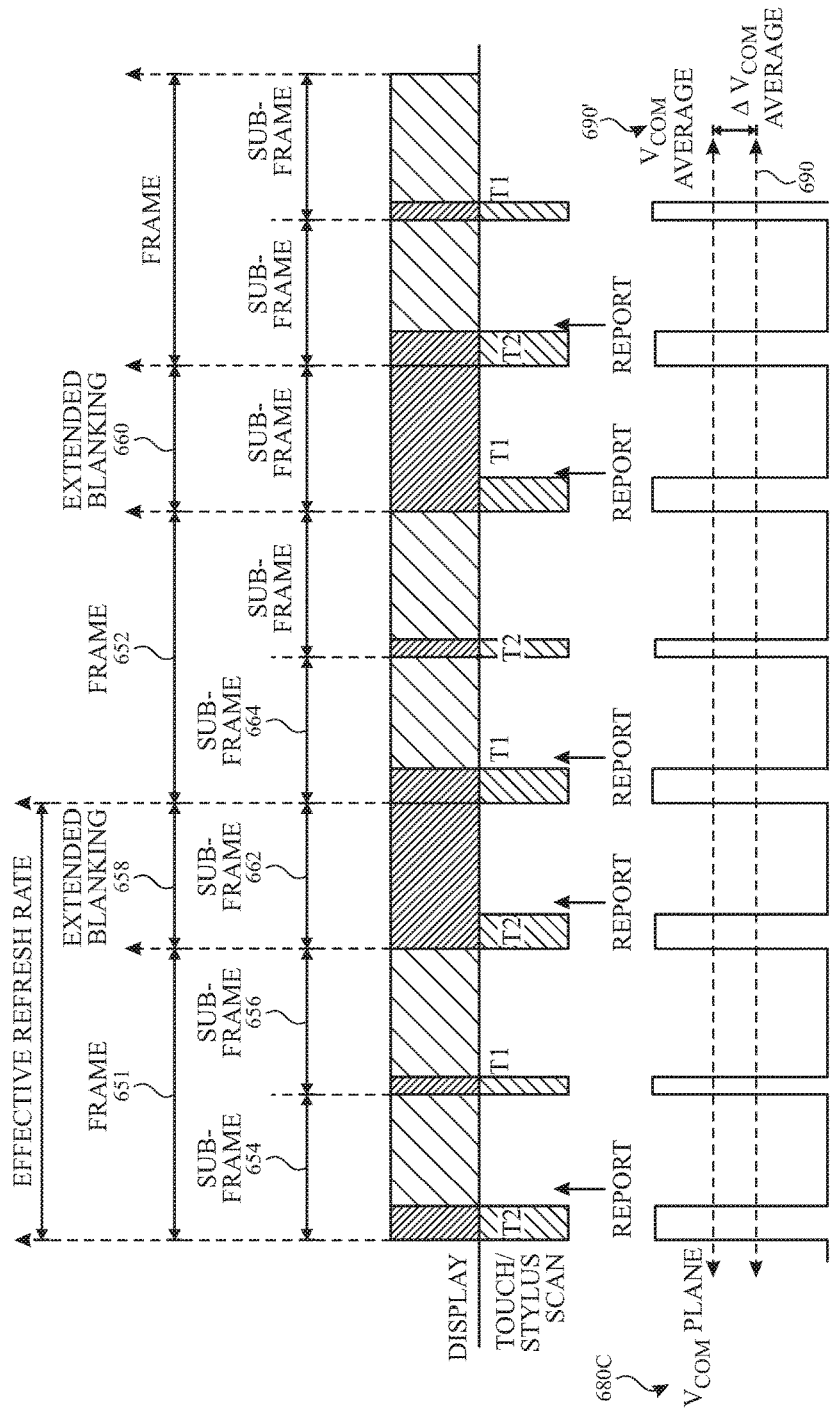
FIG. 6C illustrates another example timing diagram for synchronizing sensing operations with display operations for a variable refresh rate display according to examples of the disclosure.

FIG. 6C illustrates another example timing diagram for synchronizing sensing operations with display operations for a variable refresh rate display according to examples of the disclosure. The example illustrated in FIG. 6C includes two display frames 651 and 652 (each divided into two sub-frames 654 and 656), but unlike in FIG. 6B, the example illustrated in FIG. 6C includes one display sub-frame period of extended blanking 658 and 660. If, for example, display frame 651 corresponds to a 120 Hz frame, the effective refresh rate of display frame 651 and extended blanking 658 can be 80 Hz. For simplicity, the IFPs and corresponding scanning operation for the display frame 601 in FIG. 6A can be similar to the IFPs and corresponding scanning operation for the display frame 651 in FIG. 6C. However, during extended blanking including an odd number of sub-frames, the second sub-frame of scanning of the scanning pattern cannot be performed at the conclusion of extended blanking, as illustrated in FIG. 6B. Instead, in the sub-frame following the end of extended blanking, the sensing operations can reset and begin with the scanning operation indicated for a first sub-frame (T2). For example, during the sub-frame period 662 of extended blanking 658, the touch system can perform the same scanning operation as the first sub-frame 654 of display frame 651. During the sub-frame period 664 following the sub-frame period of extended blanking 662, the touch system can also perform the same scanning operation as the first sub-frame 654 of display frame 651. The pattern of IFPs and corresponding sensing scans can continue for subsequent sub-frames. Like in FIGS. 6A and 6B, the touch system can continue to report data from the sensing operation at the end of touch sensing operation (labeled "T2"). Although FIG. 6C illustrates one sub-frame of blanking, the same behavior can be observed for an odd number of sub-frames of extended blanking.

By performing touch sensing scans during the first sub-frame in the pattern of sensing scans, as illustrated in FIGS. 6A-6C, variable latency or mismatch problems between display and sensing data can be reduced or resolved without discarding data from the sensing operation after extended blanking (because touch scan T2 in extended blanking period 658 can be completed even without the second sub-frame). Each display frame and corresponding extended blanking can together include the same number of samples for a given refresh rate. The number of reported samples per displayed image can be calculated based on the following equation:

$$\text{number of reports} = \begin{cases} \dfrac{N}{2} + 1, \text{ for } N \text{ even} \\ \dfrac{N+1}{2} + 1, \text{ for } N \text{ odd} \end{cases}$$

where N can correspond to the number of sub-frames of extended blanking.

Because the system provides for a consistent number of sensing reports for a given refresh rate, the processing of the reported data can occur continuously (i.e., without dropping data that can degrade performance) and without frame judder. When the refresh rate is changed for a system, the processing can be updated to accommodate a different number of samples, or alternatively, some samples can be ignored.

Some variable refresh rate displays can include an immediate exit capability. An immediate capability can allow the display refresh rate to change more seamlessly. For example, in a system without an immediate exit capability, the system can have to wait until the conclusion of the extended blanking period (or integer number of display frames of extended blanking) associated with the variable refresh rate before transitioning to a different display refresh rate. Thus, when operating a display with a 120 Hz default refresh rate at a variable refresh rate of 40 Hz (i.e., four sub-frames of extended blanking), a request to change the refresh rate during extended blanking can require waiting until the conclusion of the extended blanking period (or an integer number of display frames or even number of display sub-frames when the display frame is divided into two sub-frames) before transition to an active refresh display frame followed by a different number of extended blanking frames/sub-frames. When the display includes an immediate exit capability, however, the display can transition to the active refresh display frame at the conclusion of the sub-frame at which the immediate exit request is received. The introduction of immediate exit capability can result in the introduction of errors in the voltage of the common electrode (Vcom) plane of integrated touch screen.

Immediate exits can cause a display issue due to changes in the distribution of scan events of the touch sensor panel. Display performance can be characterized based on an average Vcom parameter. As discussed above, an integrated touch screen can use a common electrode for display and touch sensing operations, and the voltage of the common electrode, Vcom, can be different during these respective operations. Using an odd-number of sub-frames of extended blanking can change the distribution of scan events and cause an increase in the average Vcom, thereby introducing a change (error) in the Vcom average. When error is introduced in the average Vcom, display pixels in the display can become brighter or darker (depending on their polarity). As the changes in the average Vcom increase over time due to repeated introduction of odd numbers of sub-frames of extended blanking, the display can demonstrate flicker due to the beating of brighter and darker displays pixels across the display (i.e., the impact and visibility of flicker can become more pronounced).

Referring back to FIGS. 6A-6C, Vcom plane 680A-C can represent the voltage of Vcom for the common electrodes during respective touch and display operations. For example, in FIG. 6A, during scanning period 622 corresponding to scan T2 and during scanning 624 corresponding to scan T1, Vcom can be at voltage 681. During display refresh periods (i.e., not during IFPs), Vcom can be at voltage 683 (inversion of polarity of the voltages can be ignored for simplicity of description). Thus in frame 601, Vcom can be at voltage 681 during period 682 of sub-frame 608 and during period 684 of sub-frame 610, and Vcom can be at voltage 683 during period 685 of sub-frame 608 and during period 687 of sub-frame 610. Due to the different voltages and durations during a frame, an average Vcom ("Vcom Avg") 690 can be based on voltages 681 and 683, and periods 682, 684, 685 and 687. In FIG. 6B, corresponding to an even number of sub-frames of extended blanking, the touch scanning pattern can repeat in the same way as illustrated in FIG. 6A, and as a result, average Vcom 690 can remain unchanged. However, when an odd number of sub-frames of extended blanking occur as illustrated in FIG. 6C, average Vcom can change. For example, scan T2 can be performed during sub-frame 662 of extended blanking 658, and then scan T2 can be performed again during sub-frame 664 of frame 652. Because Vcom experiences a voltage corresponding to the duration of a T2 scan in back-to-back sub-frames, rather than a voltage corresponding to the duration of a T1 scan, following a voltage corresponds to the duration of a T2 scan (as in FIGS. 6A and 6B), average Vcom 690' can increase (e.g., by ΔVcom average from average Vcom 690). Each time an odd number of sub-frames of extended blanking occurs, the average Vcom can further increase. The increased average Vcom can result in flicker, as described herein.

In some examples, the touch induced flicker can be reduced or eliminated by tuning Vcom to a tuning point that reduces a maximum error below a threshold, irrespective of refresh rate. In some examples, touch induced flicker can be reduced or eliminated by monitoring average Vcom, and when the change in average Vcom exceeds a threshold, Vcom can be adjusted to counteract the change in average Vcom due to the variable refresh rate. In some examples, the touch induced flicker can be reduced or eliminated by applying a direct current (DC) pedestal to pixel gate lines during touch sensing scans. In some examples, a combination of two or more of these flicker mitigation techniques can be employed. Each of these touch induced flicker mitigation techniques is explained in more detail below.

In some examples, touch induced flicker can be reduced or eliminated by tuning Vcom to a tuning point that reduces a maximum error below a threshold, irrespective of refresh rate. Vcom error uncertainty can be characterized for an integrated touch screen operating at multiple refresh rates. Based on the characterization, an amount of error for each of the multiple refresh rates can be determined. As discussed herein, when not employing extended blanking (e.g., default refresh rate) or when using an even number of sub-frames of extended blanking (e.g., for a two sub-frame scanning pattern), the Vcom error can be zero (or within a threshold level of zero). When using an odd number of sub-frames of extended blanking (e.g., for a two sub-frame scanning pattern), the Vcom error can be non-zero. The Vcom tuning point can be adjusted based on the amount of error for each of the multiple refresh rates. In some examples, a maximum error in Vcom can be determined and a minimum error in Vcom (which can be zero) can be determined. In some examples, the new Vcom tuning point can be the midpoint between the maximum and minimum error. In some examples, the new average Vcom tuning point can be based on a weighted combination of the Vcom error measurements for the variable refresh rates supported by the touch screen. In some examples, the characterization can be limited to a threshold number of supported variable refresh rates (e.g., most frequently used by applications and/or users). In some examples, the characterization can be limited to the variable refresh rate associated with only one sub-frame of extended blanking.

Figure 7:
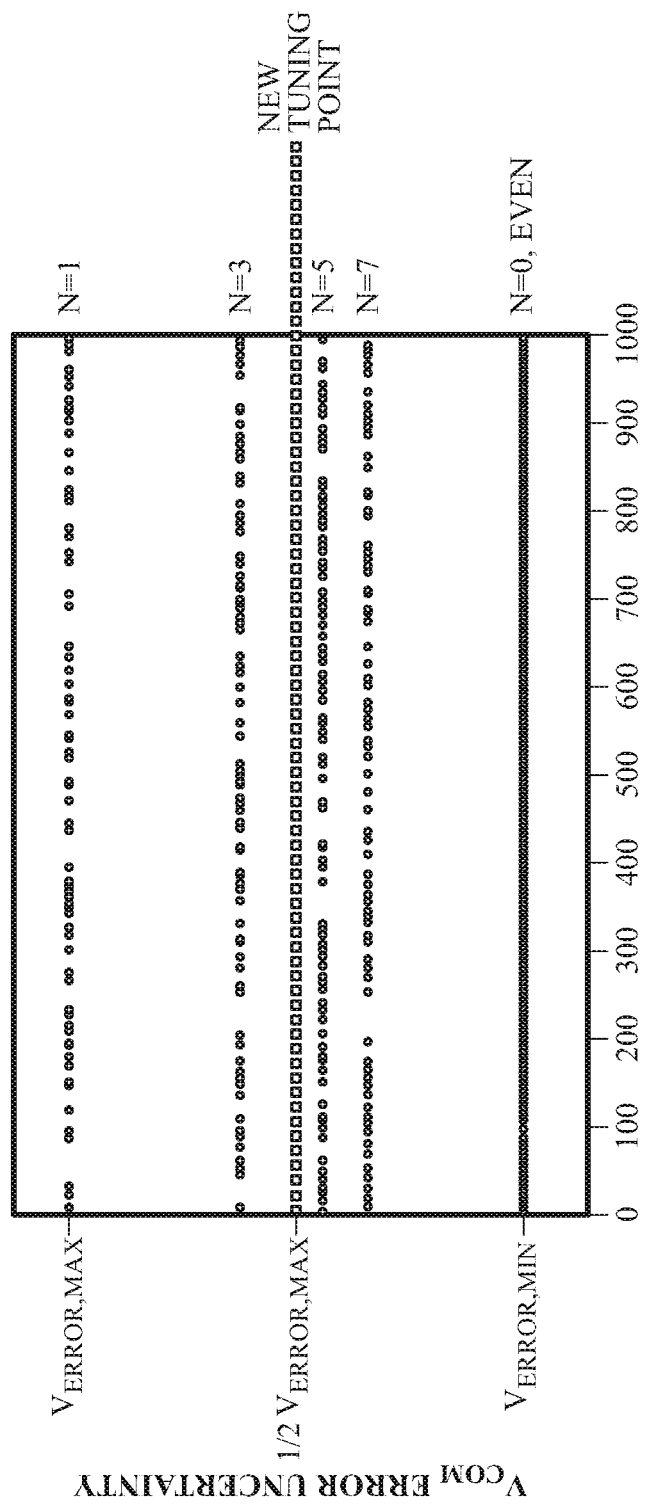
FIG. 7 illustrates an exemplary characterization plot for selecting a Vcom tuning point to mitigate touch induced flicker according to examples of the disclosure.

FIG. 7 illustrates an exemplary characterization plot for selecting a Vcom tuning point to mitigate touch induced flicker according to examples of the disclosure. As described above, Vcom error can be measured for various refresh rates, which can correspond to exiting extended blanking and different times (i.e., after a different number of sub-frames of extended blanking). The number of sub-frames of blanking is indicated in FIG. 7 by parameter "n". The Vcom error can be measured for a threshold number of trials (1000 trials are illustrated in the plot of FIG. 7). As illustrated in FIG. 7, for an even number of sub-frames of extended blanking (n=even) or no sub-frames of extended blanking (n=0), the Vcom error can be zero (or within a threshold of zero). However, for an odd number of sub-frames of extended blanking (n=odd), the Vcom error can be non-zero. For the touch screen characterized by FIG. 7, the Vcom error is maximum for n=1, and the Vcom error decreases as n increases. As described above, a new Vcom tuning point can be determined from the characterization curve such that the Vcom error can bounded between a worst case error and best case error. In some examples, the new Vcom tuning point can be the midpoint between the maximum Vcom error, $V_{error,max}$, and the minimum Vcom error, $V_{error,min}$, as illustrated in FIG. 7. The Vcom tuning can be accomplished by adjusting the Vcom values applied to the common electrode by a DAC in touch ASIC 201, display ASIC 216 or touch/display handoff module 218, for example.

Figure 8:
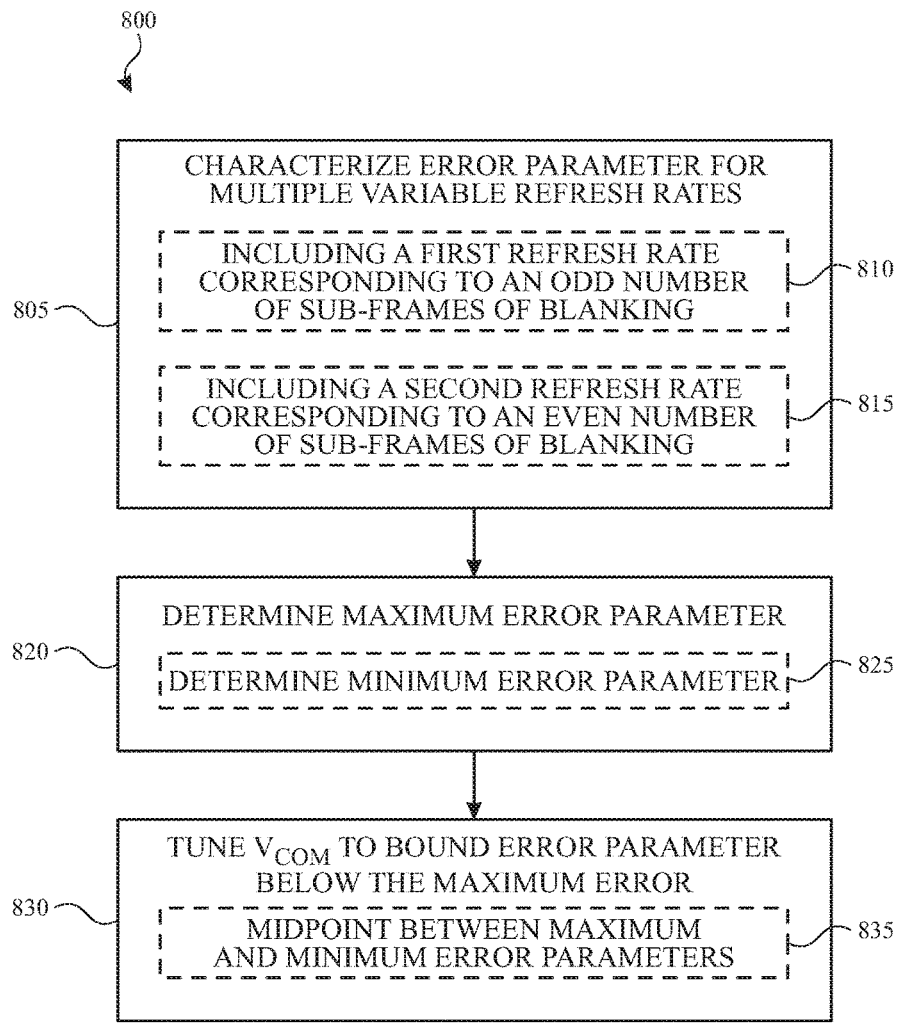
FIG. 8 illustrates an example process for tuning Vcom according to examples of the disclosure.

FIG. 8 illustrates an example process 800 for tuning Vcom according to examples of the disclosure. An error parameter of a touch screen can be characterized for multiple variable refresh rates (805). For example the error parameter can be an error in Vcom. In some examples, the characterization can include at least a first refresh rate corresponding to an odd number of sub-frames of extended blanking (i.e., n=1, 3, 5, etc.) (810). In some examples, the characterization can include at least a second refresh rate corresponding to an even number of sub-frames of extended blanking (i.e., n=0, 2, 4, etc.) (815). In some examples, a maximum error parameter value can be determined based on the characterization (820). In some examples, a minimum error parameter value can be determined based on the characterization (825). In some examples, a new tuning parameter for Vcom can be determined in order to bound the error parameter to a value less than the maximum error parameter (830). In some examples, the new tuning point for Vcom can be selected such that the error parameter can be the midpoint between the maximum and minimum error parameters (or between the maximum error parameter and zero) (835).

Figure 9:
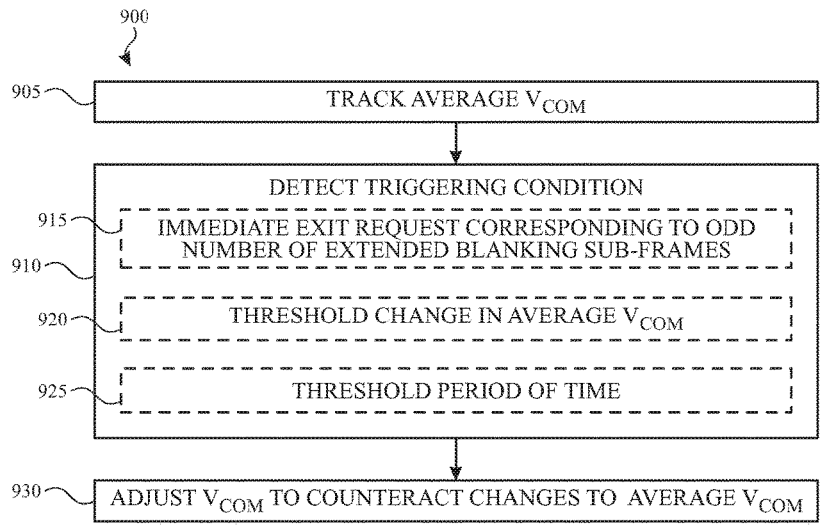
FIG. 9 illustrates an example process for tracking average Vcom and adjusting Vcom according to examples of the disclosure.

In some examples, even when bounding Vcom error, touch induced flicker can be observable (e.g., when the midpoint error between $V_{error,max}$ and $V_{error,min}$ is perceivable to a human user or above a threshold amount of error). Additionally or alternatively, in some examples, touch induced flicker can be reduced or eliminated by monitoring average Vcom and when the change in average Vcom exceeds a threshold, Vcom can be adjusted to counteract the change in average Vcom due to variable refresh rate. FIG. 9 illustrates an example process 900 for tracking average Vcom and adjusting Vcom according to examples of the disclosure. For example, a moving average of Vcom can be tracked. The system (e.g., touch ASIC 201, display ASIC 216 or touch/display handoff module 218) can track average Vcom (905). The system can detect a triggering condition to initiate Vcom adjustments to correct average Vcom (910). In some examples, the triggering condition can be the detection of an immediate exit request corresponding to an odd number of extended blanking sub-frames (915). As discussed above, the detection of an immediate exit request corresponding to an odd number of extended blanking sub-frames can result in a subsequent touch sensing scan that can increase the average Vcom. In some examples, the triggering event can be detection of a threshold change in average Vcom (920). For example, when the average Vcom changes by a threshold amount (e.g., 20 mV) or by a threshold percentage (e.g., 5%). In some examples, the triggering event can be a threshold period of time (925). For example, the adjustment can occur once per frame, per x frames, per second, per day, etc. It should be understood that these triggering events are exemplary and other triggering events are possible (e.g., when power is cycled, when the device is charging). In response to detecting the triggering event, Vcom can be adjusted to counteract the changes to average Vcom (930). For example, the Vcom values applied to the common electrode by a DAC in touch ASIC 201, display ASIC 216 or touch/display handoff module 218, for example, can be set to a value to counteract the change in average Vcom. For example, if Vcom average increased by 50 mV, Vcom could be set lower to counteract the 50 mV increase in Vcom average. In some examples, the adjustments to Vcom provided by the DAC can occur over time. For example, in some examples, the entire adjustment in Vcom can be performed in the display frame following an immediate exit. In some examples, the adjustment can be completed over the course of multiple frames or sub-frames.

In some examples, average Vcom tracking and Vcom adjustment can be disabled when the refresh rate of the device remains at the default refresh rate or when refresh rates corresponding to n=even are in use. In some examples, average Vcom tracking and Vcom adjustment can be disabled when the touch screen is in a non-variable refresh rate mode and/or when odd sub-frame refresh rates are restricted.

Figure 10:
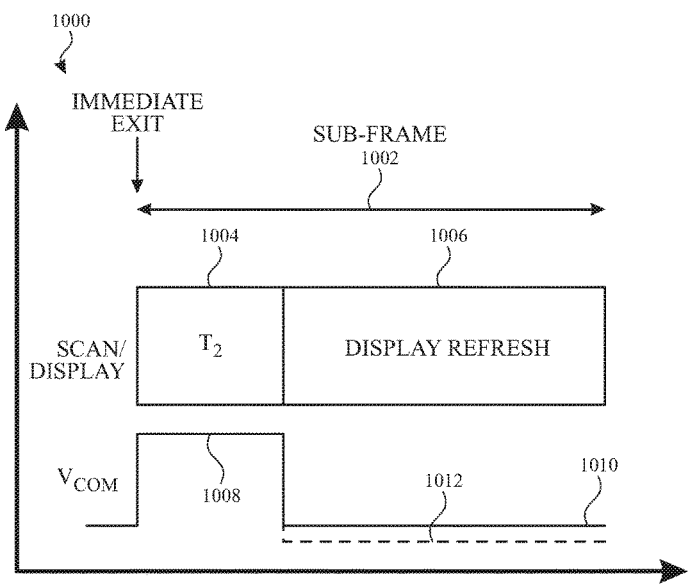
FIG. 10 illustrates an example timing diagram for adjusting Vcom according to examples of the disclosure.

FIG. 10 illustrates an example timing diagram 1000 for adjusting Vcom according to examples of the disclosure. Timing diagram 1000 in FIG. 10 illustrates one sub-frame period 1002 following processing of an immediate exit request. As discussed above, whether an even or odd number of sub-frames of extended blanking occurred before the conclusion of the extended blanking, the sub-frame that follows can be divided into two portions. Portion 1004 can correspond to performing a touch sensing scan (scan T2), and portion 1006 can correspond to performing a display refresh (or at least a portion of a display refresh). During the touch sensing scan, Vcom can be set to a first voltage 1008 by a DAC. Likewise during the subsequent display refresh, Vcom can be set to a second voltage by the DAC. When an even number of sub-frames of extended blanking occurred prior to the immediate exit, Vcom can be set to the second voltage corresponding to the default voltage setting 1010 of Vcom for display refresh without adjustment. However, when an odd number of sub-frames of extended blanking occurred prior to the immediate exit, Vcom can be set to the second voltage corresponding to an adjusted voltage setting 1012. The adjusted voltage setting 1012 can counteract the increase in Vcom during the preceding touch sensing scan. The amount of adjustment can depend on the number of frames of extended blanking. For example, referring back to FIG. 7, the amount of adjustment for n=1 can be greater than the amount of adjustment for n=7. The adjustment in Vcom can be determined during period 1004 and applied by the DAC during period 1006. It should be understood, that although the Vcom adjustment is shown to be level during period 1006, in some examples, the voltage can vary during period 1006, but the net effect of the adjustment can be to counteract the increase in average Vcom.

Tracking average Vcom and adjusting Vcom, however, can be a reactive solution to mitigating flicker in that average Vcom may first be disturbed by a touch scan following an immediate exit, even though the adjustment may quickly follow in the same sub-frame. Additionally or alternatively, in some examples, the touch induced flicker can be reduced or eliminated by applying a DC pedestal to pixel gate lines during touch sensing scans. Using a DC pedestal can allow for mitigating flicker without changing the conventional tuning of Vcom.

Figure 11:
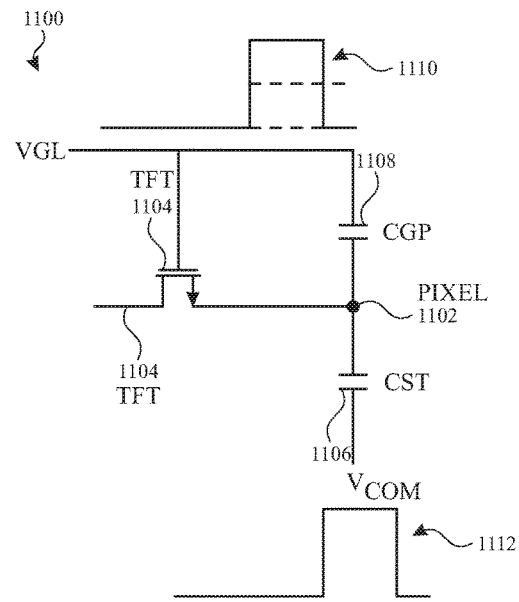
FIG. 11 illustrates an exemplary circuit to which a DC pedestal can be applied to mitigate touch induced flicker according to examples of the disclosure.

FIG. 11 illustrates an exemplary circuit to which a DC pedestal can be applied to mitigate touch induced flicker according to examples of the disclosure. Circuit 1100 can include a display pixel 1102 coupled to the source of a thin film transistor (TFT) 1104. Circuit 1100 models a storage capacitor Cst 1106 between display pixel 1102 and a common electrode, Vcom, and a parasitic capacitance Cgp 1108 between the gate of TFT 1104 and display pixel 1102. The touch induced flicker described herein can be understood to derive from errors in the pixel voltage due to the voltage divider circuit between capacitances Cst 1106 and Cgp 1108 when Vcom is transitioned during a touch sensing scan. In some examples, when a touch sensing scan occurs and Vcom transitions, the voltage on the gate of TFT 1104 (VGL) can be boosted by DC pedestal voltage corresponding to Vcom. In some example, the DC pedestal can be applied by coupling the gate line (which can typically be floating during a touch sensing scan) to a charge pump via a switch (e.g., charge pump 240). In some examples, the charge pump can be part of display ASIC 216.

When the DC pedestal voltage tracks the Vcom transition voltage during the touch sensing scan, display pixel 1102 can essentially be bootstrapped and as a result the Vcom error can be mitigated or canceled. In some examples, the DC pedestal voltage can be different than the Vcom voltage transition. For example, the DC pedestal can be 50% of the voltage transition by Vcom. In such an example, the Vcom error can be reduced by approximately 50% as well. In some examples, the DC pedestal can be 2.5V-5V.

It should be understood that circuit 1100 is an example circuit and a more complicated model can include additional circuit components. As a result, the cancellation of Vcom error provided by a DC pedestal can be less than absolute cancellation in practice.

Figure 12:
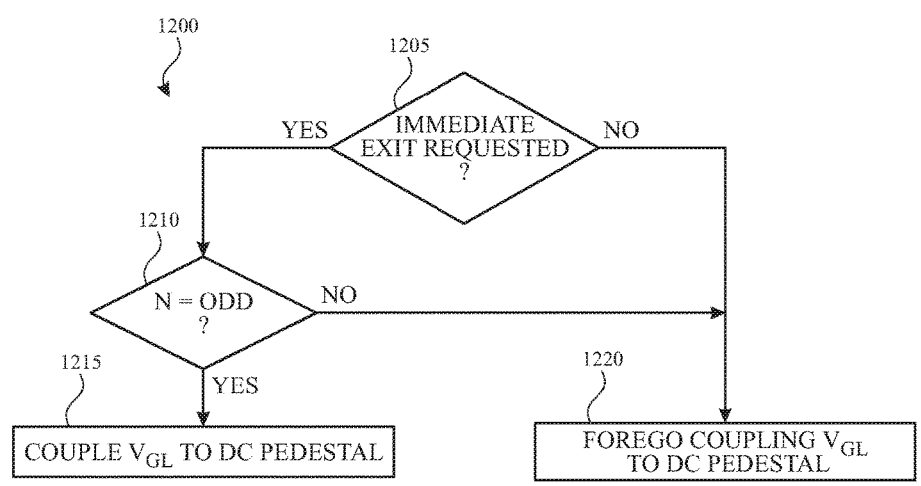
FIG. 12 illustrates an exemplary process for using a DC pedestal to mitigate touch induced flicker according to examples of the disclosure.

In some examples, the DC pedestal can be coupled for each touch sensing scan. In some examples, the DC pedestal can be applied more selectively. For example, the DC pedestal can be applied only when variable refresh rates are enabled (or in use) or when variable refresh rates requiring mitigation are being employed. For example, when variable refresh rate operation is disabled, the flicker issue described herein can be moot. Additionally, when immediate exits are not available, Vcom can be adjusted appropriately to handle different numbers of sub-frames of extended blanking. FIG. 12 illustrates an exemplary process 1200 for using a DC pedestal to mitigate touch induced flicker according to examples of the disclosure. At 1205, the system can determine whether an immediate exit request is requested. When no immediate exit is requested, the system can forego applying the DC pedestal (1220). When an immediate exit is requested, the system can determine, at 1210, whether an odd number of sub-frames of extended blanking occur. When an odd number of sub-frames of extended blanking occur, the system can couple VGL to the DC pedestal (1215). When the number of sub-frames of extended blanking is not odd, the system can forego applying the DC pedestal (1220).

Therefore, according to the above, some examples of the disclosure are directed to a method for mitigating touch induced flicker. The method can comprise characterizing an error in a voltage parameter for a common electrode of an integrated touch screen for one or more refresh rates of a variable refresh rate display, the one or more refresh rates including at least a first refresh rate corresponding to an odd number of blanking sub-frames; determining a maximum error in the voltage parameter for the one or more refresh rates; and tuning the voltage parameter for the common electrode based on the maximum error. Additionally or alternatively to one or more of the examples disclosed above, in some examples, the one or more refresh rates can further include at least a second refresh rate corresponding to an even number of blanking sub-frames. Additionally or alternatively to one or more of the examples disclosed above, in some examples, the method can further comprise: determining a minimum error in the voltage parameter for the one or more refresh rates. Additionally or alternatively to one or more of the examples disclosed above, in some examples, tuning the voltage parameter for the common electrode can be further based on the minimum error. Additionally or alternatively to one or more of the examples disclosed above, in some examples, tuning the voltage parameter for the common electrode can comprise setting the voltage parameter at a midpoint between the maximum error and the minimum error.

Some examples of the disclosure are directed to a method for mitigating touch induced flicker. The method can comprise: tracking an average voltage parameter for a common electrode of an integrated touch screen; detecting a triggering condition; and in response to detecting the triggering condition, adjusting a voltage parameter for the common electrode. Additionally or alternatively to one or more of the examples disclosed above, in some examples, the triggering condition can comprise detecting a change in the average voltage parameter exceeds a threshold. Additionally or alternatively to one or more of the examples disclosed above, in some examples, the triggering condition can comprise detecting an odd number of sub-frames of extended blanking. Additionally or alternatively to one or more of the examples disclosed above, in some examples, the triggering condition can comprise detecting a threshold period of time. Additionally or alternatively to one or more of the examples disclosed above, in some examples, adjusting the voltage parameter for the common electrode can comprise reducing the voltage parameter to counteract a change in the average voltage parameter for the common electrode. Additionally or alternatively to one or more of the examples disclosed above, in some examples, the voltage parameter can be adjusted during a display refresh operation.

Some examples of the disclosure are directed to a method for mitigating touch induced flicker. The method can comprise: during a touch sensing operation, applying a first voltage to a common electrode and coupling a direct current (DC) pedestal to a display pixel transistor gate line; and during a display refresh operation, applying a second voltage to the common electrode and decoupling the DC pedestal from the display pixel transistor gate line. Additionally or alternatively to one or more of the examples disclosed above, in some examples, a voltage of the DC pedestal can be equal to a voltage difference between the first voltage and second voltage applied to the common electrode. Additionally or alternatively to one or more of the examples disclosed above, in some examples, a voltage of the DC pedestal can be less than a voltage difference between the first voltage and second voltage applied to the common electrode.

Some examples of the disclosure are directed to a method for mitigating touch induced flicker. The method can comprise: determining whether an immediate exit is requested; in accordance with the determination that the immediate exit is requested, coupling a direct current (DC) voltage to a gate line during a touch sensing scan following the immediate exit request; and in accordance with the determination that the immediate exit is not requested, forgoing coupling the DC voltage to the gate line during the touch sensing scan following the immediate exit request.

Some examples of the disclosure are directed to a non-transitory computer-readable medium including instructions, which when executed by one or more processors, cause the one or more processors to perform any of the above methods. Some examples of the disclosure are directed to an apparatus comprising: a touch screen; one or more processors; and a non-transitory computer-readable medium including instructions, which when executed by the one or more processors, cause the one or more processors to perform any of the above methods.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method for mitigating touch induced flicker, the method comprising:
   characterizing an error in a voltage parameter for a common electrode of an integrated touch screen for one or more refresh rates of a variable refresh rate display, the one or more refresh rates including at least a first refresh rate corresponding to an odd number of blanking sub-frames;
   determining a maximum error in the voltage parameter for the one or more refresh rates; and
   tuning the voltage parameter for the common electrode based on the maximum error.

2. The method of claim 1, wherein the one or more refresh rates further include at least a second refresh rate corresponding to an even number of blanking sub-frames.

3. The method of claim 2, further comprising:
   determining a minimum error in the voltage parameter for the one or more refresh rates.

4. The method of claim 3, wherein tuning the voltage parameter for the common electrode is further based on the minimum error.

5. The method of claim 4, wherein tuning the voltage parameter for the common electrode comprising setting the voltage parameter at a midpoint between the maximum error and the minimum error.

6. An apparatus comprising:
   an integrated touch screen;
   one or more processors; and
   a non-transitory computer-readable medium including instructions, which when executed by the one or more processors, cause the one or more processors to:
      characterize an error in a voltage parameter for a common electrode of an integrated touch screen for one or more refresh rates of a variable refresh rate display, the one or more refresh rates including at least a first refresh rate corresponding to an odd number of blanking sub-frames;
      determine a maximum error in the voltage parameter for the one or more refresh rates; and
      tune the voltage parameter for the common electrode based on the maximum error.

7. The apparatus of claim 6, wherein the one or more refresh rates further include at least a second refresh rate corresponding to an even number of blanking sub-frames.

8. The apparatus of claim 7, wherein the instructions, when executed by the one or more processors, further cause the one or more processors to:
   determine a minimum error in the voltage parameter for the one or more refresh rates.

9. The apparatus of claim 8, wherein tuning the voltage parameter for the common electrode is further based on the minimum error.

10. The apparatus of claim 9, wherein tuning the voltage parameter for the common electrode comprising setting the voltage parameter at a midpoint between the maximum error and the minimum error.

11. A non-transitory computer-readable medium including instructions, which when executed by one or more processors, cause the one or more processors to:
   characterize an error in a voltage parameter for a common electrode of an integrated touch screen for one or more refresh rates of a variable refresh rate display, the one or more refresh rates including at least a first refresh rate corresponding to an odd number of blanking sub-frames;

determine a maximum error in the voltage parameter for the one or more refresh rates; and tune the voltage parameter for the common electrode based on the maximum error.

12. The non-transitory computer-readable medium of claim 11, wherein the one or more refresh rates further include at least a second refresh rate corresponding to an even number of blanking sub-frames.

13. The non-transitory computer-readable medium of claim 12, wherein the instructions, when executed by the one or more processors, further cause the one or more processors to:

determine a minimum error in the voltage parameter for the one or more refresh rates, wherein tuning the voltage parameter for the common electrode is further based on the minimum error.

14. The non-transitory computer-readable medium of claim 13, wherein tuning the voltage parameter for the common electrode comprising setting the voltage parameter at a midpoint between the maximum error and the minimum error.

15. An apparatus comprising:
a touch screen;
one or more processors; and
a non-transitory computer-readable medium including instructions, which when executed by the one or more processors, cause the one or more processors to:
track an average voltage parameter for a common electrode of an integrated touch screen;
detect a triggering condition based on tracking the average voltage parameter for the common electrode of the integrated touch screen; and
in response to detecting the triggering condition, adjust a voltage parameter for the common electrode.

16. The apparatus of claim 15, wherein the triggering condition comprises detecting a change in the average voltage parameter exceeds a threshold.

17. The apparatus of claim 15, wherein the triggering condition comprises detecting an odd number of sub-frames of extended blanking.

18. The apparatus of claim 15, wherein the triggering condition comprises detecting a threshold period of time.

19. The apparatus of claim 15, wherein adjusting the voltage parameter for the common electrode comprises reducing the voltage parameter to counteract a change in the average voltage parameter for the common electrode.

20. The apparatus of claim 15, wherein the voltage parameter is adjusted during a display refresh operation.

* * * * *